(12) United States Patent
Klostermann

(10) Patent No.: US 6,694,006 B1
(45) Date of Patent: Feb. 17, 2004

(54) METHOD OF AND A SYSTEM FOR DELIVERING CALLS TO PLURAL SERVICE PROVIDER DOMAINS

(75) Inventor: Lucas Klostermann, Breda (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/582,289
(22) PCT Filed: Dec. 21, 1998
(86) PCT No.: PCT/EP98/08570
§ 371 (c)(1), (2), (4) Date: Sep. 6, 2000
(87) PCT Pub. No.: WO99/34615
PCT Pub. Date: Jul. 8, 1999

(30) Foreign Application Priority Data

Dec. 24, 1997 (EP) .............................. 97204100

(51) Int. Cl.[7] ................................ H04M 7/00
(52) U.S. Cl. .................. 379/221.13; 379/221.09; 379/221.12
(58) Field of Search ............... 379/221.08, 221.09, 379/221.1, 221.12, 221.13, 219, 220.01, 207.02

(56) References Cited

U.S. PATENT DOCUMENTS

| | | | |
|---|---|---|---|
| 5,598,464 A | 1/1997 | Hess et al. | 379/213.01 |
| 5,854,836 A | * 12/1998 | Nimmagadda | 379/221.13 |
| 6,097,801 A | * 8/2000 | Williams et al. | 379/221.13 |
| 6,108,332 A | * 8/2000 | Kasiviswanathan | 370/360 |
| 6,130,940 A | * 10/2000 | Wong et al. | 379/221.09 |

FOREIGN PATENT DOCUMENTS

| | | |
|---|---|---|
| GB | 2280334 | 1/1995 |
| WO | 97/36451 | 10/1997 |
| WO | 98/28897 | 7/1998 |

OTHER PUBLICATIONS

Ramachendra P. Batni, "The Intelligent Network's New Role", Telephony, Nov. 11, 1996, pp. 60–62.

P.A. Ramsdale, "The Development of Personal Communications", Electronics & Communications Engineering Journal, Jun. 1996, pp. 143–151.

Tim Bishop, "Freeing the Network for Competition", Telecommunications, Apr. 1995, pp. 75–80.

W. Lautenschlager et al., "Routing Service for the Provision of Number Portability", XVI World Telecom Congress Proceedings, Sep. 1997, pp. 235–242.

* cited by examiner

Primary Examiner—Benny Tieu

(57) ABSTRACT

A method of and a system for delivering a call to a called subscriber in a service provider domain of an Intelligent Network (IN) telecommunication system (1) comprising plural service provider domains (10; 20). Each such domain (10; 20) comprises interconnected Service Switching Point (SSP) (16; 24) and Service Control Point (SCP) equipment (17; 25). For a ported subscriber (21'), porting information is stored (27; 31; 34) associated with routing information to another service provider domains (10) and service information of the ported subscriber (21'), in particular whether the ported subscriber (21') has availed himself of services relating to call delivery. Each time a call is to be delivered to a called ported subscriber (21'), porting information associated with routing and service information retrieved (27; 31; 34) and the call will be directly delivered to the ported called subscriber (21') at his actual service provider domain (10) identified by the routing information and in accordance with the service profile information of the called subscriber (21').

12 Claims, 1 Drawing Sheet

METHOD OF AND A SYSTEM FOR DELIVERING CALLS TO PLURAL SERVICE PROVIDER DOMAINS

FIELD OF THE INVENTION

The present invention relates generally to Intelligent Network (IN) telecommunication services and, more specifically, to a method of and a system for delivering calls to subscribers in plural service provider domains.

BACKGROUND OF THE INVENTION

Modern Intelligent Network (IN) telecommunication systems provide several telecommunication and network services. The services available to a subscriber, either for free or on a subscription basis, are contained in so-called user profile information, stored in Service Control Point (SCP) equipment of the telecommunications system.

Due to the deregulation of public telecommunication, present IN telecommunication systems are comprised of plural service provider domains which may operate in different or the same geographical areas. The number, type and charging of services may vary among the service providers.

Number Portability (NP) allows subscribers to change service provider domains without changing their subscriber or telephone number. A call to a ported subscriber will be delivered to the actual location of the ported subscriber despite dialling of the original subscriber number.

In an article by W. Lautenschlager et al., "Routing Service for the Provision of Number Portability", International Switching Symposium (ISS '97), vol. 2, 21–26 September 1997, pages 234–242, Toronto several network methods for the implementation of number portability have been discussed.

Besides the so-called full IN routing, wherein for each call in a network a routing data base or routing service is queried for obtaining necessary routing information, a call to a ported subscriber generally will invoke interrogation of the service provider domain at which the called subscriber was originally registered, also called the donor domain. From the routing information obtained, the call will be delivered to the ported subscriber in the actual service provider domain identified by the routing information.

Routing information associated with a ported subscriber may be provided in separate local or global NP data base equipment or in the SCP of the home service provider or donor domain, such as also disclosed by U.S. Pat. No. 5,598,464. The routing information provided may comprise the (or a reference to the) actual location of the ported subscriber in a particular service provider domain, or a reference to a so-called gateway providing an interface between service provider domains. Gateways are used, for example, if service providers for competitive or other reasons do not wish to directly disclose sensitive domain information to their competitors.

One of the problems associated with NP is the requirement of delivering calls to ported subscribers in accordance with telecommunication and network services available to a ported subscriber in his service provider domain.

British patent application 2,280,334 discloses a method of invoking a telephone user profile in connection with a user initiated routing of a call. User service profile information is stored in all the switches of a telephone network, using an intermediate central computer.

Besides excessive storage space requirements and a strict scheme for updating all the switches in the case of changes in the service profile information of a subscriber, in particular if different service provider domains are involved, service providers may have a genuine requirement based, among others, on providing competitive services, not to disclose information as to service subscriptions etc. Accordingly, in practice, service providers will prefer to store service profile information of their subscribers in the SCP equipment of their own service domain.

In such a case, after a call has been routed to the actual service provider domain of a ported subscriber, a further inquiry of the SCP equipment of this domain has to be initiated to find out whether or not the ported subscriber has availed himself of services, at least services pertinent to the delivery of a call. Those skilled in the art will appreciate that such a further inquiry increases the delay in the delivery of calls to ported subscribers, compared to non-ported subscribers. However, it is an objective of the telecommunication practice to keep call set-up times as small as possible.

SUMMARY OF THE INVENTION

It is an object of the present invention to provide an efficient method of and a system for delivering calls to ported, subscribers in accordance with services available to a ported subscriber.

According to the invention, in a first aspect thereof, there is provided a method of delivering calls to called subscribers in a service provider domain of an Intelligent Network (IN) telecommunication system comprising plural service provider domains, each such domain comprising interconnected Service Switching Point (SSP) and Service Control Point (SCP) equipment, the SSP being operable for delivering a call from a calling subscriber to a called subscriber, and the SCP being operable for controlling telecommunication and network services available to a subscriber in his service provider domain, wherein for ported subscribers routing information is provided and calls to the ported subscribers are delivered in accordance with such routing information, the method comprises the steps of:

providing porting information, at least for ported subscribers, the porting information being associated with routing information and information as to services available to ported subscribers, in particular services relating to the delivery of calls, and delivering calls to called ported subscribers in accordance with the routing information and the service information provided, wherein calls to ported subscribers not having services relating to the delivery of calls are delivered without inquiring the SCP, equipment of the service provider domain of the ported subscribers, and wherein calls to ported subscribers having services relating to the delivery of calls are delivered by inquiring the SCP equipment of the service provider domain of the ported subscribers in accordance with the service information provided.

In the method according to the invention, for each subscriber porting information is available concerning the actual location of the called subscriber and whether or not interrogation of the SCP of the actual service provider domain is required. The SCP may contain or have access to the porting information.

If the called subscriber is within his home service provider or donor domain, the call will be delivered after SCP consultation for porting information following established principals of IN by the SSP equipment under the control of the SCP and the telecommunication and network services available to the called subscriber.

However, if the porting information obtained indicates that the called subscriber is ported to a different service provider domain, routing information is retrieved, identifying the ported subscriber at the other service provider domain.

Following the method of the invention, the routing information is directly linked to information at least indicating whether the call has to be delivered in accordance with services available to the called subscriber. Thus, information as to the telecommunication and network services of the called subscriber becomes directly available with completion of the routing and the call to the ported subscriber can be delivered in accordance with its respective service profile. This without any separate interrogation step whether or not the called subscriber has availed himself of services pertinent to the delivery of calls. As a minimum, only information has to be disclosed relating to whether a ported subscriber comprises services and not the complete service profile at the other service provider domain.

Those skilled in the art will appreciate that the method according to the invention minimizes signaling overhead. With the method according to the invention, each service provider maintains his own service information. Thus, service providers are principally not forced to update common network data bases or the like which, for setting up a reliable update procedure, essentially requires disclosure of competitive service information. However, common network data bases are still applicable, if desired.

The method according to the invention hardly requires additional resources for storage and update of porting information. The service information part of the porting information, in its simplest form, may comprise a so-called service flag or trigger. Such a service flag or trigger essentially comprises a single data bit or a few data bits, indicating whether and under what conditions services, in particular services relating to call delivery, are available to the called ported subscriber. A service flag trigger may also involve the conditional setting of a so-called mask bit or mask bits, simply called "mask".

In a further embodiment of the method according to the invention, the porting information may be retrieved from a dedicated data base operable for storing routing information of ported subscribers.

In a preferred embodiment of the method according to the invention, the porting information inclusive routing and service information, is retrieved from the SCP of the home service provider domain of the ported subscriber.

In a yet further embodiment of the method according to the invention, the routing information includes information as to whether the subscriber is ported to a different part of his own service provider domain, that is such a part operable for controlling telecommunication and network services.

With this feature, it is possible to provide (additional) telecommunication and network services to subscribers not directly available in the part of the service provider domain to which the subscriber connects. That is, a subscriber can be locally ported within his own home service provider domain for providing (the additional) services. With the method of the invention, calls to a locally ported subscriber will be supported by the services available, without any delays other than for obtaining the porting information.

Those skilled in the art will appreciate that the (additional) service profile information may be comprised in the same SCP of a service provider domain, however at different locations thereof and accessible through a local number portability lookup.

Following the invention, porting information may be retrieved at each call to each subscriber or, selectively, only for calls to actually ported subscribers.

The invention further provides a system for delivering calls to called subscribers in a service provider domain of an Intelligent Network (IN) telecommunication system comprising plural service provider domains, each such domain comprising interconnected Service Switching Point (SSP) and Service Control Point (SCP) equipment, the SSP being operable for delivering a call from a calling subscriber to a called subscriber through intermediate exchanges or switches, and the SCP being operable for controlling telecommunication and network services available to a subscriber in his service provider domain, the system comprises:

means for storing routing information of a ported subscriber, means for storing porting information, at least for ported subscribers, the porting information being associated with routing information and information as to services available to ported subscribers, in particular services relating to the delivery of calls, means for retrieving and evaluating porting information, operatively connected such that calls to ported subscribers not having services relating to the delivery of calls are delivered without inquiring the SCP equipment of the service provider domain of the ported subscribers, and in that calls to ported subscribers having services relating to the delivery of calls are delivered by inquiring the SCP equipment of the service provider domain of the ported subscribers in accordance with the service information provided.

The above-mentioned and other features and advantages of the present invention will now be discussed in the following description with reference to the accompanying drawings.

DETAILED DESCRIPTION OF THE EMBODIMENTS

Figure 1:
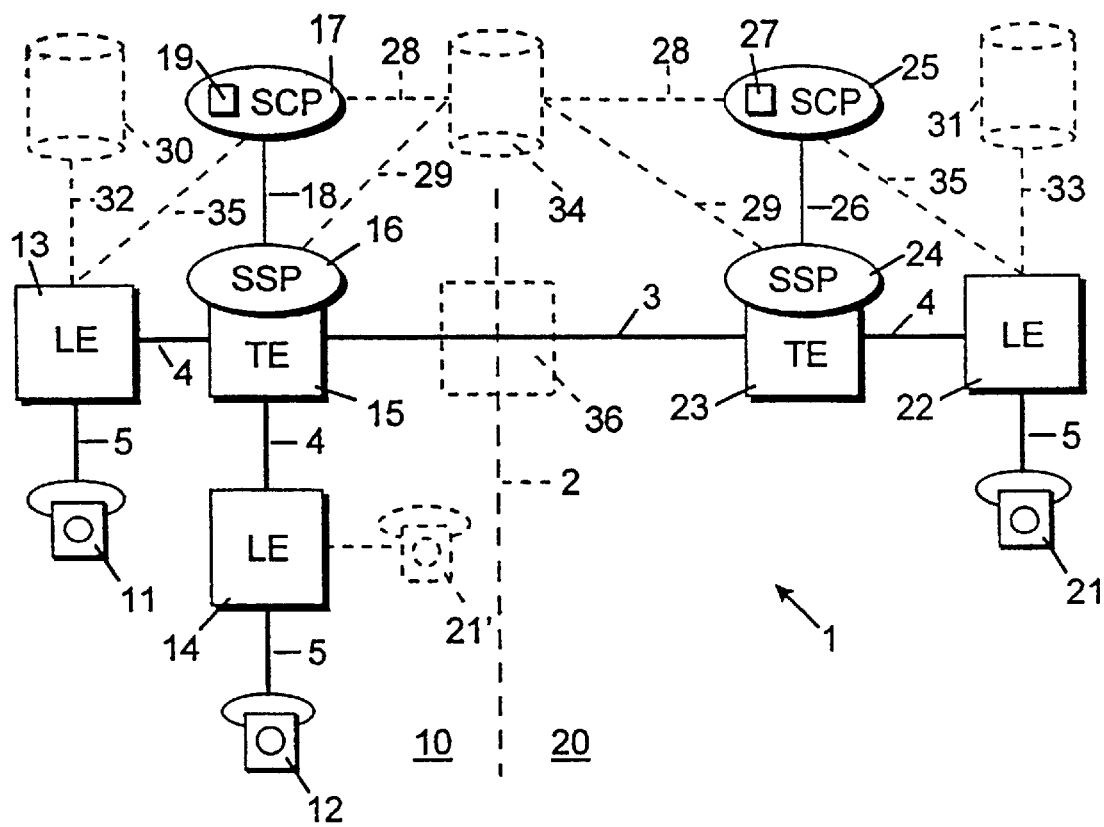
FIG. 1 shows a simplified block diagram of an Intelligent Network (IN) telecommunication system, comprised of two service provider domains, incorporating the method according to the present invention.

FIG. 1 shows a typical Intelligent Network (IN) telecommunication system 1, comprising a first service provider domain 10 and a second service provider domain 20. For clarification purposes, the IN system 1 is limited to two service provider domains. However, in practice, IN systems may be comprised of a plurality of service provider domains, serving the same or different geographical areas. In the embodiment shown, it is assumed that the service provider domains 10, 20 serve separate geographical areas, indicated by a broken border line 2.

A typical IN telecommunication provider domain of a Public Switched Telephone Network (PSTN), for example, comprises groups of interconnected exchanges or switches. Subscribers 11, 12; 21 connect through a Local Exchange (LE) 13, 14; 22 to at least one Trunk or Transit Exchange (TE) 15; 23, respectively. The service provider domains 10; 20 are connected by a trunk line 3 between their TE 15; 23. The LE 13, 14; 22 and TE 15; 23 respectively, connect through trunk lines 4, while the subscribers 11, 12; 21 connect to their LE 13, 15; 22 by subscriber or drop lines 5.

In the embodiment shown, the TE 15; 23 are of the type comprising Service Switching Point (SSP) equipment 16; 24, controlling the TE in order to establish the required transmission links for placing and receiving calls by the subscribers 11, 12; 21.

Each service provider domain 10; 20 further comprises Subscriber Control Point (SCP) equipment 17; 25. In each service provider domain the SCP connects by a signaling network 18; 26 to the SSP of its service provider domain, respectively. The SCP 17; 25 are operable for controlling telecommunication and network services available to a subscriber 11., 12; 21 in his home service provider domain 10; 20, respectively. Such as indicated in FIG. 1.

Subscribers may have a desire to change their service provider domain, for example due to differences in services provided by different service providers, for costs reasons etc. Number Portability (NP) allows subscribers to change service provider domains without changing their original subscriber number.

In order to deliver a call to a called ported subscriber, routing information has to be obtained. The routing information may be stored in separate local data base means at the donor or home service provider domain of the ported subscriber, such as a data base 30; 31 which connects by a signaling link 32; 33 to the LE 13; 22, respectively. Alternatively, the routing information may be stored in global data base means 34, connecting by signaling links 28; 29 to the SCP 17; 25 and the SSP 16; 24, respectively. Further, routing information may be stored in storage means 19; 27 of the SCP 17; 25, for example. In order to indicate their optional nature, the respective storage means and signaling links are shown by broken lines.

Following the invention, the routing information of subscribers 11, 12; 21 of a service provider domain is enhanced with information concerning services of a subscriber. In particular services relating to the delivery of calls to a ported subscriber. Essentially, this service information may be limited to a simple trigger or flag if the subscriber is-ported to a different service provider domain. In the SCP 17; 25 of the service provider domain 10; 20 in which the ported subscriber is actually located, this service information triggers service profile information of the ported subscriber 11, 12; 21.

For the purpose of explaining the method according to the invention, it is now assumed that subscriber 21 is ported from his home service provider or donor domain 20 to service provider domain 10, connecting to LE 14 as indicated by broken lines and reference numeral 21'. Further, it is assumed that in his new service provider domain 10 several telecommunication and network services are available to the subscriber 21'. such as call waiting, dual call switching etc.

Suppose subscriber 11 at the service provider domain 10, i.e. the originating domain, is calling subscriber 21, using the original subscriber or telephone number at LE 22. The call will be set up through LE 1.3, TE 15 and TE 23 via the intermediate network lines 3, 4 and 5.

Following the invention, the call to subscriber 21 results in porting information indicating that subscriber 21 has been ported and the availability of services for user 21. This porting information may be retrieved either from the data base means 31, the data base means 34 or the storage means 27 of the service provider domain 20.

However, instead of setting up a call to the donor domain 20 of the user 21 for retrieving porting information, this porting information may be directly retrieved from the porting data base means.

From the porting information, indicating that subscriber 21 has been ported, routing information is obtained, either directly providing the actual, physical location of the subscriber, or a reference to a so-called gateway 36 linking the TE 15; 23, if a complete separation of service network provider domains 10; 20 is required. The gateway 36 provides an interface between the service provider domains 10; 20. At the gateway 36 routing information to the actual location of the ported subscriber 21' is available. The service information part of the porting information may be added to the routing information provided at the gateway 21. Due to its optional nature, the gateway 31 is shown in broken lines.

The routing information together with the service information of subscriber 21 will be transferred to TE 15 and SSP 16 of the service provider domain 10. From analysing the routing information, it will become clear that subscriber 21 is (temporarily) located at LE 14, such that at TE 15 the call of the calling subscriber 11 will be routed by SSP 16 to the called subscriber 21' under the control of the applicable services. By analysing the service information of the received porting information, it will become clear whether the ported subscriber has availed himself of services, at least relating to call delivery. In the affirmative the applicable service profile information in the SCP 17 will be interrogated via the signaling link 18, in order to control. TE 15 and LE 14 for providing the required services.

If the porting information contains such service information indicating that the ported subscriber has no services relating to call delivery, the SCP 17 will not be interrogated.

As will be appreciated by those skilled in the art, after the routing information has been analysed and the called ported subscriber has been located, with the method of the invention no separate inquiry has to be performed in the actual service provider domain 10 whether the call has to be delivered following special services. This inquiry step is already implicitly performed by the provision of the service information flag or trigger in the porting information, provided to the actual service provider domain of the ported subscriber. A service flag trigger may also involve the conditional setting of a so-called mask bit or mask bits, simply called "mask".

With the above method according to the invention, no competitive information as to the service provisions of a service provider has to be stored in a common system data base or data bases local to other service providers, and no common update procedures are required. Due to the linking of the routing information and the service information signaling overhead is minimised. Thereby easily meeting the requirements relating to set-up times of a call to a ported subscriber in accordance with services available to the ported subscriber in his service provider domain.

In the above example, it has been assumed that a subscriber is ported from one service provider domain to another. However, it is also feasible that services have to be provided to a subscriber, which services may be located at a different part of his service provider domain. Local number portability can be applied, such that the subscriber is locally ported to such part of the service provider domain where the services are available. The provision, by the invention, of routing and service information will result in a quick delivery of the call to the locally ported subscriber. It is noted that local number portability can apply within the same SCP, for example comprised of parts providing different types of services.

Instead of porting information in the form of a simple trigger, as disclosed above, with the method according to the invention the porting information may also comprise more extensive service information or a "mask" operation.

In the method according to the invention, the available signaling possibilities can be used for delivering a call in accordance with the service profile information of a called ported subscriber.

Figure 2:
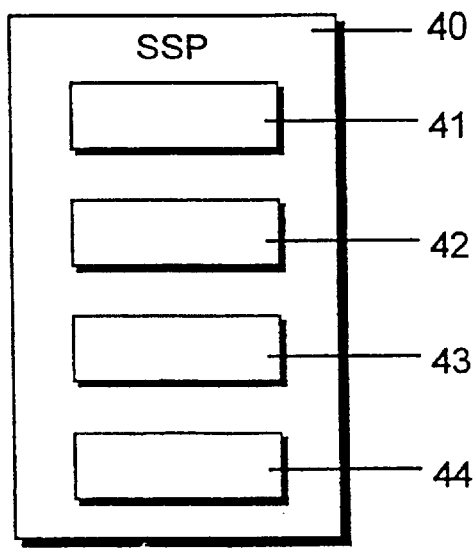
FIG. 2 shows a simplified block diagram of an SSP arranged for use in a system according to the present invention.

FIG. 2 shows a simplified block diagram of an SSP 40 for use in the IN system 1 of the invention.

In addition to the known functionality of an SSP, generally designated by block 41, the SSP 40 shown comprises means 42 for retrieving porting information of a called subscriber; means 43 for evaluating the porting information, for delivering the call to a called ported subscriber at his ported network position; and means 44 for communicating the routing information and service information to the SSP of the actual service provider domain of the called ported subscriber or the gateway 36. Those skilled in te art will appreciate that the means 42–44 identified above, can be implemented by one or both additional hardware and software means in an SSP.

The invention is, of course, not limited to the embodiment of the system and SSP shown and described above. Without departing from the scope of the invention as defined in the attached claims, several modifications and additions can be provided, such as retrieving the porting information of an SCP from an LE, as disclosed in FIG. 1 by the signal links 35 between the LE 13; 22 and the SCP 17; 25, for example. Porting information may be retrieved for each call to each subscriber or only for calls to actually ported subscribers, such as known at the LE 13; 22, for example.

What is claimed is:

1. A method of delivering calls to called subscribers in a service provider domain of an Intelligent Network (IN) telecommunication system comprising plural service provider domains, each such domain comprising interconnected Service Switching Point (SSP) and Service Control Point (SCP) equipment, said SSP being operable for delivering a call from a calling subscriber to a called subscriber, and said SCP being operable for controlling telecommunication and network services available to a subscriber in his service provider domain, wherein for ported subscribers routing information is provided and calls to said ported subscribers are delivered in accordance with said routing information, said method comprising the steps of:
   providing porting information, at least for ported subscribers, said porting information being associated with routing information and information as to services available to ported subscribers, in particular services relating to the delivery of calls, and
   delivering calls to called ported subscribers in accordance with said routing information and said service information provided, wherein
   calls to ported subscribers not having services relating to the delivery of calls are delivered without inquiring said SCP equipment of said service provider domain of said ported subscribers, and wherein
   calls to ported subscribers having services relating to the delivery of calls are delivered by inquiring said SCP equipment of said service provider domain of said ported subscribers in accordance with said service information.

2. A method according to claim 1, wherein said service information of said porting information comprises a flag or trigger indicating whether services are available to said ported subscriber.

3. A method according to claim 1, wherein said porting information is retrieved from a data base operable for storing routing information of a ported subscriber.

4. A method according to claim 1, wherein said porting information is retrieved from the home service provider domain of said ported subscriber.

5. A method according to claim 4, wherein said porting information is available from said SCP of said home service provider domain of said ported subscriber.

6. A method according to claim 1, wherein said porting information includes information as to whether said ported subscriber is ported to a different part of his home service provider domain.

7. A method according to claim 6, wherein said different part of said home service provider domain is comprised in said SCP of said home service provider domain of said subscriber.

8. A system for delivering calls to called subscribers in a service provider domain of an Intelligent Network (IN) telecommunication system comprising plural service provider domains, each such domain comprising interconnected Service Switching Point (SSP) and Service Control Point (SCP) equipment, said SSP being operable for delivering a call from a calling subscriber to a called subscriber through intermediate exchanges or switches, and said SCP being operable for controlling telecommunication and network services available to a subscriber in his service provider domain, said system comprising:
   means for storing routing information of a ported subscriber,
   means for storing porting information, at least for ported subscribers, said porting information being associated with routing information and information as to services available to ported subscribers, in particular services relating to the delivery of calls,
   means for retrieving and evaluating porting information, operatively connected such that
   calls to ported subscribers not having services relating to the delivery of calls are delivered without inquiring said SCP equipment of said service provider domain of said ported subscribers, and in that
   calls to ported subscribers having services relating to the delivery of calls are delivered by inquiring said SCP equipment of said service provider domain of said ported subscribers in accordance with said service information.

9. A system according to claim 8, wherein said means for storing porting information are comprised by data base means operable for storing routing information of a ported subscriber.

10. A system according to claim 8, wherein said means for storing porting information inclusive said routing and said service information are comprised by said SCP of said home service provider domain of a ported subscriber.

11. A system according to claim 8, comprising means for transmitting said service information of said porting information of said called ported subscriber to said SCP of said service provider domain identified by said routing information, said SCP being arranged for delivering said call in accordance with said service information of said called ported subscriber.

12. A system according to claim 10, wherein said SCP is arranged for storing of each subscriber information pertaining as to whether said subscriber is ported to part of his home service provider domain operable for controlling telecommunication and network services.

* * * * *